US011663269B2

(12) United States Patent
Lin et al.

(10) Patent No.: US 11,663,269 B2
(45) Date of Patent: May 30, 2023

(54) ERROR CORRECTION METHOD AND APPARATUS, AND COMPUTER READABLE MEDIUM

(71) Applicant: BEIJING BAIDU NETCOM SCIENCE AND TECHNOLOGY CO., LTD., Beijing (CN)

(72) Inventors: Zenan Lin, Beijing (CN); Jiajun Lu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 242 days.

(21) Appl. No.: 16/790,016

(22) Filed: Feb. 13, 2020

(65) Prior Publication Data

US 2020/0272668 A1 Aug. 27, 2020

(30) Foreign Application Priority Data

Feb. 21, 2019 (CN) .......................... 201910130735.9

(51) Int. Cl.
*G06F 16/903* (2019.01)
*G06F 16/901* (2019.01)
(Continued)

(52) U.S. Cl.
CPC .... *G06F 16/90344* (2019.01); *G06F 16/9027* (2019.01); *G06F 40/242* (2020.01); *G06N 5/02* (2013.01)

(58) Field of Classification Search
CPC .............. G06F 16/9027; G06F 40/242; G06F 16/90324; G06F 11/0793; G06F 11/0796; G06N 5/02
See application file for complete search history.

(56) References Cited

U.S. PATENT DOCUMENTS

| 8,402,032 | B1 | 3/2013 | Brunsman et al. |
| 9,002,866 | B1* | 4/2015 | Brunsman ............... G06F 16/24 707/758 |

(Continued)

FOREIGN PATENT DOCUMENTS

| CN | 106528845 A | 3/2017 |
| CN | 107193921 | * 9/2017 |

(Continued)

OTHER PUBLICATIONS

Johansson et al., "Intent-aware temporal query modeling for keyword suggestion," PIKM '12: Proceedings of the 5th Ph.D. workshop on Information and knowledge Nov. 2012, pp. 83-86 (Year: 2012).*

(Continued)

*Primary Examiner* — Mark D Featherstone
*Assistant Examiner* — Kweku William Halm
(74) *Attorney, Agent, or Firm* — Lippes Mathias LLP (57) ABSTRACT

The present disclosure provides an error correction method. The error correction method includes: determining a plurality of target candidate entities from a preset dictionary tree based on a query request; for each target candidate entity, calculating a first probability that the target candidate entity is a legitimate entity; evaluating each target candidate entity to obtain an evaluation result, a target candidate entity corresponding to an evaluation result; and determining a real intent entity corresponding to the query request based on the first probability and the evaluation result.

18 Claims, 4 Drawing Sheets

(51) Int. Cl.
   *G06F 40/242*   (2020.01)
   *G06N 5/02*    (2023.01)

(56) References Cited

U.S. PATENT DOCUMENTS

| | | | |
|---|---|---|---|
| 9,788,179 B1* | 10/2017 | Sharifi | G06F 16/5854 |
| 11,442,992 B1* | 9/2022 | Moon | G06N 20/00 |
| 2014/0280015 A1 | 9/2014 | Marantz et al. | |
| 2014/0282136 A1* | 9/2014 | Marantz | G06F 3/0484 |
| | | | 715/764 |
| 2015/0178966 A1 | 6/2015 | Mukhopadhyay | |
| 2017/0097961 A1 | 4/2017 | Li | |
| 2017/0099291 A1* | 4/2017 | Clark | G06F 21/6254 |
| 2017/0277770 A1* | 9/2017 | Singh | G06F 3/0237 |
| 2018/0246901 A1* | 8/2018 | Fuchs | G06F 16/90324 |
| 2018/0260406 A1 | 9/2018 | Wan et al. | |
| 2019/0102370 A1* | 4/2019 | Nelson | G06F 40/143 |
| 2020/0098161 A1* | 3/2020 | Smith | G06V 10/42 |
| 2020/0210490 A1* | 7/2020 | Hutchins | G06F 40/20 |
| 2020/0310490 A1* | 10/2020 | VanBlon | G06F 3/04812 |
| 2021/0150545 A1* | 5/2021 | Wu | H04L 51/02 |

FOREIGN PATENT DOCUMENTS

| | | |
|---|---|---|
| CN | 107193921 A | 9/2017 |
| CN | 107430448 A | 12/2017 |
| CN | 108399265 A | 8/2018 |
| CN | 108932323 A | 12/2018 |
| CN | 102693309 A | 9/2021 |
| JP | 2003091552 A | 3/2003 |
| JP | 2004318594 A | 11/2004 |
| JP | 2007025834 A | 2/2007 |
| JP | 2008009542 A | 1/2008 |
| JP | 2012079029 A | 4/2012 |
| WO | 2014152936 A2 | 9/2014 |

OTHER PUBLICATIONS

Hu et al., "Understanding user's query intent with Wikipedia" WWW'09: Proceedings of the 18th international conference on World wide webApr. 2009, pp. 471-480 (Year: 2009).*

Glater et al., "Intent-Aware Semantic Query Annotation," SIGIR '17: Proceedings of the 40th International ACM SIGIR Conference on Research and Development in Information Retrieval, pp. 485-494 (Year: 2017).*

CN107193921—Search Engine-Oriented Error Correction Method and System of Chinese and English Mixed Querying (Year: 2017).*

Extended European Search Report for EP Application No. 20156968.8, dated May 20, 2020,10 pages.

Office Action for Japanese Application No. 2020-024073, dated May 11, 2021, 5 pages.

Yu Hirate et al., "Keyword Correction Algorithm in Keyword Based Search Engine", DEIM Forum May 25, 2010. 8 pages (Abstract in English).

Office Action for Japanese Application No. 2020-024073, dated Jan. 25, 2022, 4 pages.

"A method of constructing a high-speed and compact ngram language using a Double Array", Papers published at the 19th Annual Meeting of Language Processing Society (Mar. 2013), pp. 342-345.

Office Action for European Application No. 20156968.8, dated Jun. 21, 2022, 6 pages.

Office Action for Chinese Application No. 201910130735.9, dated Jul. 11, 2022, 5 pages.

* cited by examiner

ERROR CORRECTION METHOD AND APPARATUS, AND COMPUTER READABLE MEDIUM

CROSS-REFERENCE TO RELATED APPLICATIONS

This application is based on and claims a priority to Chinese Patent Application Serial No. 201910130735.9, filed on Feb. 21, 2019, the entire contents of which are incorporated herein by reference.

FIELD

Embodiments of the present disclosure relate to a field of Internet technology, and more particularly to an error correction method, an error correction apparatus, and a computer readable medium.

BACKGROUND

With the rapid development of information technology, the network has extended to all aspects of society, and an interactive device becomes more and more popular. A user may enter a query request by typing a keyboard or other ways. The interactive device converts the query request into a candidate according to a preset standard mapping and displays the candidate, such that the user may select the candidate.

In an actual application, there may be an error in the query request entered by the user during the querying due to an input method, a wrong typing on the keyboard, etc. Therefore, a query result returned by a query engine is significantly different from a query result expected by the user because the query engine may not correct the error in the query request correctly.

SUMMARY

The present disclosure provides an error correction method, an error correction apparatus, and a computer readable medium.

According to a first aspect of embodiments of the present disclosure, embodiments of the present disclosure provide an error correction method. The method includes: determining a plurality of target candidate entities from a preset dictionary tree based on a query request; for each target candidate entity, calculating a first probability that each the target candidate entity is a legitimate entity; evaluating each target candidate entity, to obtain an evaluation result, a target candidate entity corresponding to an evaluation result; and determining a real intent entity corresponding to the query request based on the first probability and the evaluation result.

In some embodiments, before determining the plurality of target candidate entities from the preset dictionary tree based on the query request, the method further includes: calculating a second probability that the query request is inputted correctly; in which, determining the plurality of target candidate entities from the preset dictionary tree based on the query request includes: determining the plurality of target candidate entities from the preset dictionary tree based on the query request in response to that the second probability is smaller than a first threshold.

In some embodiments, determining the plurality of target candidate entities from the preset dictionary tree based on the query request includes: performing a calculation on a character string in the query request and the preset dictionary tree, to obtain a plurality of original candidate entities; and selecting the plurality of target candidate entities corresponding to the query request from the plurality of original candidate entities based on a second threshold.

In some embodiments, selecting the plurality of target candidate entities corresponding to the query request from the plurality of original candidate entities based on the second threshold includes: calculating a first distance between each original candidate entity and the query request; comparing each first distance with the second threshold; and determining the original candidate entity corresponding to the first distance smaller than or equal to the second threshold as the target candidate entity.

In some embodiments, when the second threshold includes a third threshold and the fourth threshold, selecting the plurality of target candidate entities corresponding to the query request from the plurality of original candidate entities based on the second threshold includes: calculating a second distance between each original candidate entity and the query request based on a first algorithm; comparing each second distance with the third threshold; extracting a first candidate entity corresponding to the second distance smaller than or equal to the third threshold from the plurality of original candidate entities; calculating a third distance between each first candidate entity and the query request based on a second algorithm; and taking the first candidate entity corresponding to the third distance smaller than or equal to the fourth threshold as the target candidate entity.

In some embodiments, when the first algorithm is an edit distance algorithm, the second algorithm is a Jaccard distance algorithm; and when the first algorithm is the Jaccard distance algorithm, the second algorithm is the edit distance algorithm.

In some embodiments, evaluating each target candidate entity includes: extracting attribution information corresponding to respective target candidate entities; determining weights for the attribution information corresponding to respective target candidate entities; and evaluating each target candidate entity based on the weight.

In some embodiments, determining the real intent entity corresponding to the query request based on the first probability and the evaluation result includes: for each target candidate entity, weighting the first probability and the evaluation result corresponding to the target candidate entity, to obtain a weighted value corresponding to the target candidate entity; determining a target candidate entity corresponding to a maximum weighted value as the real intent entity.

In some embodiments, the method further includes: extracting a plurality of entities from a preset knowledge base; and taking each entity as a node of the preset dictionary tree, taking an entity item of the entity as a child node of the node, and assigning a unique identifier to the entity item, to obtain the preset dictionary tree.

According to another aspect of embodiments of the present disclosure, embodiments of the present disclosure further provide an error correction apparatus. The error correction apparatus includes: an obtaining module, a probability calculating module, an evaluating module and a determining module. The obtaining module is configured to determine a plurality of target candidate entities from a preset dictionary tree based on a query request. The probability calculating module is configured to, for each target candidate entity, calculate a first probability that the target candidate entity is a legitimate entity. The evaluating module is configured to evaluate each target candidate entity to obtain an evaluation result, a target candidate entity corresponding to an evaluation result. The determining module is configured to determine a real intent entity corresponding to the query request based on the first probability and the evaluation result.

In some embodiments, the probability calculating module is configured to calculate a second probability that the query request is inputted correctly; and the obtaining module is configured to determine the plurality of target candidate entities from the preset dictionary tree based on the query request in response to that the second probability is smaller than a first threshold.

In some embodiments, the obtaining module is configured to: perform a calculation on a character string in the query request and the preset dictionary tree, to obtain a plurality of original candidate entities; and select the plurality of target candidate entities corresponding to the query request from the plurality of original candidate entities based on a second threshold.

In some embodiments, the obtaining module is configured to: calculate a first distance between each original candidate entity and the query request; compare each first distance with the second threshold; and determine the original candidate entity corresponding to the first distance smaller than or equal to the second threshold as the target candidate entity.

In some embodiments, when the second threshold includes a third threshold and the fourth threshold, the obtaining module is configured to: calculate a second distance between each original candidate entity and the query request based on a first algorithm; compare each second distance with the third threshold; extract a first candidate entity corresponding to the second distance smaller than or equal to the third threshold from the plurality of original candidate entities; calculate a third distance between each first candidate entity and the query request based on a second algorithm; and take the first candidate entity corresponding to the third distance smaller than or equal to the fourth threshold as the target candidate entity.

In some embodiments, when the first algorithm is an edit distance algorithm, the second algorithm is a Jaccard distance algorithm; and when the first algorithm is the Jaccard distance algorithm, the second algorithm is the edit distance algorithm.

In some embodiments, the evaluating module is configured to: extract attribution information corresponding to respective target candidate entities; determine weights for the attribution information corresponding to respective target candidate entities; and evaluate each target candidate entity based on the weight.

In some embodiments, the determining module is configured to: for each target candidate entity, weight the first probability and the evaluation result corresponding to the target candidate entity, to obtain a weighted value corresponding to the target candidate entity; and determine a target candidate entity corresponding to a maximum weighted value as the real intent entity.

In some embodiments, the apparatus further includes: an extracting module and a constructing module. The extracting module is configured to extract a plurality of entities from a preset knowledge base. The constructing module is configured to take each entity as a node of the preset dictionary tree, to take an entity item of the entity as a child node of the node, and to assign a unique identifier to the entity item, to obtain the preset dictionary tree.

According to another aspect of embodiments of the present disclosure, embodiments of the present disclosure further provide a computer readable medium having a computer program stored thereon. When the computer program is executed by a processor, the above method is implemented.

With embodiments of the present disclosure, the plurality of target candidate entities are determined from the preset dictionary tree based on the query request; for each target candidate entity, the first probability that the target candidate entity is the legitimate entity is calculated; each target candidate entity is evaluated to obtain an evaluation result, a target candidate entity corresponding to an evaluation result; and a real intent entity corresponding to the query request is determined based on the first probability and the evaluation result. In this way, a problem of poor error correction effect in the related art can be avoided, an error correction cost can be reduced, and an efficiency and an accuracy for the error correction can be improved.

BRIEF DESCRIPTION OF THE DRAWINGS

The accompanying drawings are used to provide a further understanding for embodiments of the present disclosure, and constitute a part of the specification. The accompanying drawings are used to explain the present disclosure together with embodiments of the present disclosure, and do not constitute a limitation for the present disclosure. The above and other features and advantages will become more apparent to the skilled in the art by describing detailed exemplary embodiments with reference to the accompanying drawings. In the accompanying drawings.

REFERENCE NUMERALS

1, obtaining module; 2, probability calculating module; 3, evaluating module; 4, determining module; 5, extracting module; 6, constructing module; 11, processing units (or processors); 12, memory; 13, bus; 14, RAM; 15, cache memory; 16, storage system; 17, program modules; 18, utility tool; 19, external device; 20, display; 21, I/O interface; 22, a network adapter.

DETAILED DESCRIPTION

In order to enable the skilled in the art to understand the technical solutions of the present disclosure better, an error correction method, an error correction apparatus and a computer readable medium provided by the present disclosure will be described in detail below with reference to the accompanying drawings.

Example embodiments will be described more fully below with reference to the accompanying drawings. However, the example embodiments may take different forms and should not be construed to limit embodiments explicitly set forth herein. On the contrary, these embodiments are provided so that this disclosure will be thorough and complete, and will fully convey the scope of the present disclosure to those skilled in the art.

As used herein, the term "and/or" includes any and all combinations of one or more associated listed items.

The terms used herein are for the purpose of describing particular embodiments, and not intended to limit this disclosure. The singular forms "a", "an" and "the" are also intended to include the plural forms, unless indicated otherwise. It should also be understood that, when used in the specification, terms "comprising" and/or "containing" specify the presence of stated features, wholes, steps, operations, elements and/or components, but do not exclude the presence or addition of one or more other features, wholes, steps, operations, elements, components and/or groups thereof.

Exemplary embodiments are described herein with reference to plan illustrations and/or cross section illustrations that are schematic illustrations of idealized embodiments. As such, variations from the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by the skilled in the art. It should be understood that, terms defined in a commonly used dictionary should be construed to have a meaning consistent with their meaning in the context of the related art and the present disclosure, and will not be construed in an idealized or overly formal sense, unless limited expressly by the present disclosure.

According to an aspect of embodiments of the present disclosure, embodiments of the present disclosure provide an error correction method.

Figure 1:
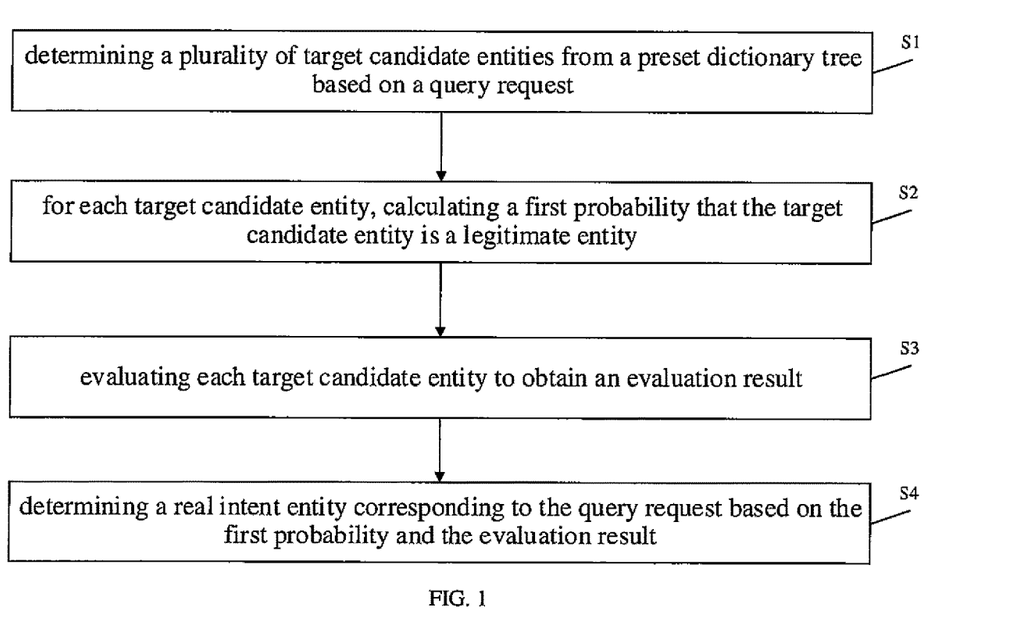
FIG. 1 is a flow chart illustrating an error correction method according to an embodiment of the present disclosure.

FIG. 1 is a flow chart illustrating an error correction method according to an embodiment of the present disclosure.

As illustrated in FIG. 1, the method includes the followings.

At block S1, a plurality of target candidate entities are determined from a preset dictionary tree based on a query request.

In detail, the preset dictionary tree is obtained in response to the query request inputted by a user through a user terminal. m target candidate entities are determined based on the dictionary tree and the query request, in which, m is an integer greater than 1. The user terminal may be a mobile device such as a mobile phone, a laptop, a tablet and a personal digital assistant, or may be a fixed device such as a desktop computer.

The dictionary tree may be called as a word query tree "Trie", which is a tree structure and a variant of a hash tree. The dictionary tree has the following advantages: by utilizing a common prefix of a character string to reduce query time, unnecessary comparison for character strings may be reduced to maximum extent, thus leading a query efficiency higher than the hash tree.

In embodiments of the present disclosure, by determining the target candidate entities in combination with the dictionary tree, the target candidate entities may be selected efficiently, comprehensively and diversely, thereby implementing an accurate for error correction.

In some embodiments, after the query request is received, before the action at block S1, the method further includes: calculating a second probability that the query request is inputted correctly, and performing the action at block S1 in response to that the second probability is smaller than a first threshold.

In detail, the query request may be a correctly-inputted query request (which may be recognized or spelled correctly), or may be an incorrectly-inputted query request (which may not be recognized or may be misspelled). The second probability may be a probability that the query request is the correctly-inputted query request. The probability that the query request is inputted correctly may be calculated based on a language model (such as a NGRAM language model) to obtain the second probability.

When the second probability is greater than or equal to the first threshold, it indicates that the query request is the correctly-inputted query request.

When the second probability is smaller than the first threshold, it indicates that the query request is the incorrectly-inputted query request. Therefore, there is a need to perform error correction on the query request, and the action at block S1 is performed.

The first threshold may be set based on a requirement. For an application scene with a high precision requirement, the first threshold may be set as a larger value. For an application scene with a low precision requirement, the first threshold may be set as a smaller value. In other words, the first threshold may be set based on different application scenes. The first threshold corresponding to the application scene with a high precision requirement is greater than the first threshold corresponding to the application scene with a low precision requirement.

With the technical solution according to embodiments of the present disclosure, by comparing the first threshold with the second probability and performing an error correction on the query request when the second probability is smaller than the first threshold, a waste of time and resources caused by performing the error correction directly on the query request in the related art may be avoided, thereby reducing a cost of the error correction.

Figure 2:
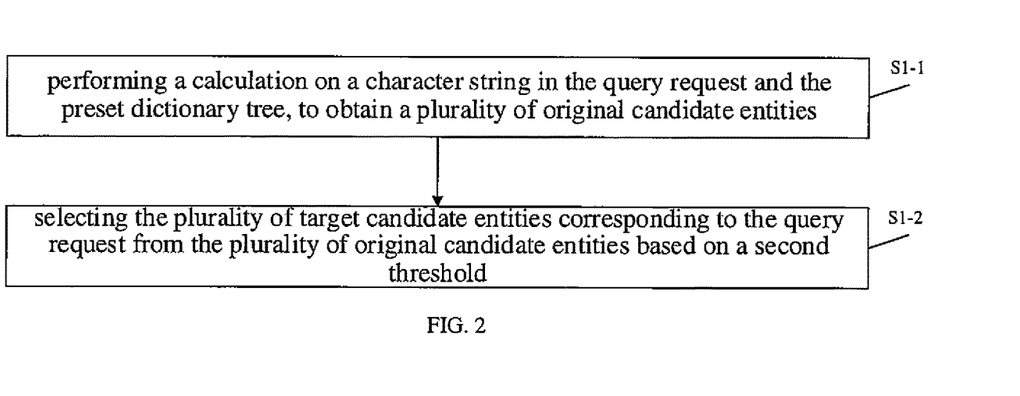
FIG. 2 is a flow chart illustrating a method for determining a target candidate entity according to an embodiment of the present disclosure.

In combination with FIG. 2, in some embodiments, block S1 includes the followings.

At block S1-1, a calculation is performed on a character string in the query request and the preset dictionary tree, to obtain a plurality of original candidate entities.

In detail, the query request is composed of the character string. It should be understood that, the term "character string" recited herein may include a sequence of one or more of text, numbers, letters, symbols, and the like in text form.

In detail, the calculation is performed on the character string and the dictionary tree based on a matching algorithm in the related art, to extract the plurality of original candidate entities matching the character string from the dictionary tree.

In some embodiments, the calculation is performed on the character string and the dictionary tree by a multi-mode matching algorithm, to extract the plurality of original candidate entities corresponding to the character string selected from the dictionary tree. There are a plurality of original candidate entities.

With the technical solution of performing the calculation on the character string and the dictionary tree in embodiments of the present disclosure, entities affecting the accuracy of an error correction result may be excluded, that is, the part of entities related to the query request may be selected from the entities, and the part of entities not related to the query request are excluded. In this way, on the one hand, a complexity of subsequent processing procedures may be reduced, on the other hand, an efficiency and an accuracy of error correction may be improved.

At block S1-2, the plurality of target candidate entities corresponding to the query request are selected from the plurality of original candidate entities based on a second threshold.

The second threshold may also be set based on the application scene, which is not elaborated herein.

The action at block S1-1 is equivalent to filtering the entities elementarily. The action at block S1-2 is equivalent to filtering the entities again. Similarly, by filtering the entities again, the complexity of the subsequent processing procedures may be further reduced, and the efficiency and the accuracy of error correction may be further improved.

Figure 3:
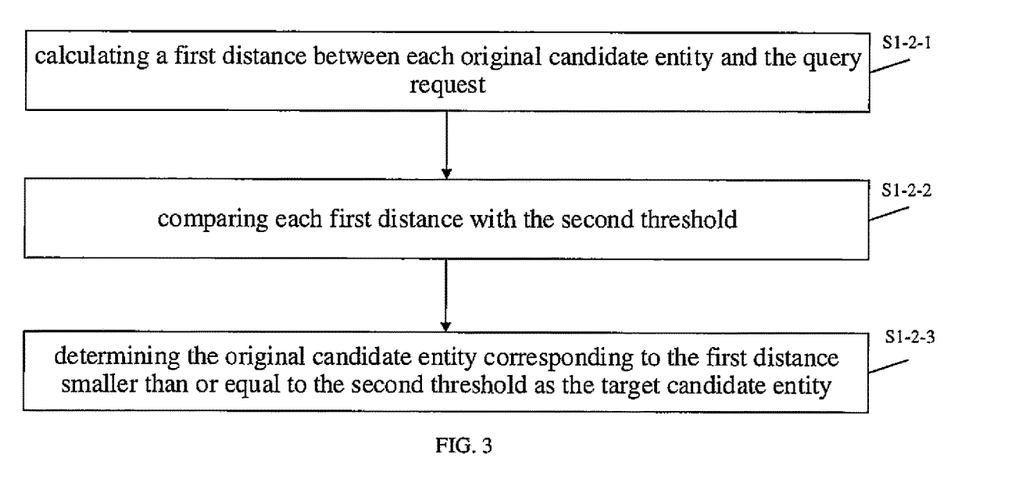
FIG. 3 is a flow chart illustrating a method for determining a target candidate entity according to another embodiment of the present disclosure.

In combination with FIG. 3, in some embodiments, block S1-2 includes the followings.

At block S1-2-1, a first distance between each original candidate entity and the query request is calculated.

In detail, the first distance between each original candidate entity and an error part in the query request may be calculated based on a distance calculating method in the related art.

At block S1-2-2, each first distance is compared with the second threshold.

At block S1-2-3, the original candidate entity corresponding to the first distance smaller than or equal to the second threshold is determined as the target candidate entity.

It should be understood that, the first distance may be greater than the second threshold, or may be smaller than or equal to the second threshold. When the first distance is greater than the second threshold, the original candidate entity corresponding to the first distance is filtered out, to reduce a waste of computing resources and to improve computing efficiency. When the first distance is smaller than or equal to the second threshold, the original candidate entity corresponding to the first distance is determined as the target candidate entity, to improve a reliability and an accuracy of error correction.

Figure 4:
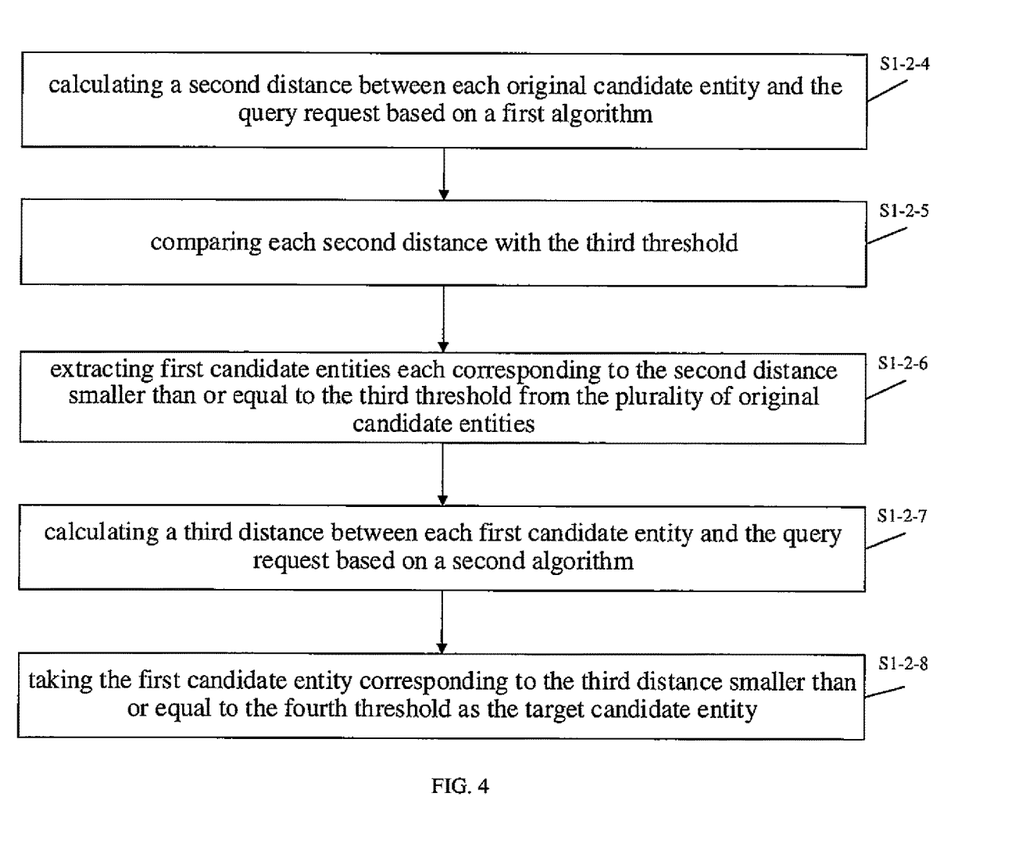
FIG. 4 is a flow chart illustrating a method for determining a target candidate entity according to another embodiment of the present disclosure.

In combination with FIG. 4, in some embodiments, when the second threshold includes a third threshold and the fourth threshold, block S1-2 includes the followings.

At block S1-2-4, a second distance between each original candidate entity and the query request is calculated based on a first algorithm;

In detail, the second distance between each original candidate entity and an error part in the query request may be calculated based on the distance calculating method in the related art.

At block S1-2-5, each second distance is compared with the third threshold.

At block S1-2-6, first candidate entities each corresponding to the second distance smaller than or equal to the third threshold are extracted from the plurality of original candidate entities.

Similarly, the second distance may be greater than the third threshold, and may also be smaller than or equal to the third threshold. When the second distance is greater than the third threshold, the original candidate entity corresponding to the second distance is filtered out, to reduce the waste of computing resources and to improve the computing efficiency. When the second distance is smaller than or equal to the third threshold, the original candidate entity corresponding to the second distance is determined as the first candidate entity.

At block S1-2-7, a third distance between each first candidate entity and the query request is calculated based on a second algorithm.

The second algorithm is an algorithm for calculating a distance in the related art which is different from the first algorithm.

At block S1-2-8, the first candidate entity corresponding to the third distance smaller than or equal to the fourth threshold is taken as the target candidate entity.

In embodiments of the present disclosure, the calculation may be performed by employing two different algorithms, to select the candidate entity from the original candidate entities sequentially and to determine the target candidate entity finally, thereby reducing the waste of the computing resources and improving the computing efficiency. In embodiments of the present disclosure, the distance calculating method may not be limited in detail.

In some embodiments, when the first algorithm is an edit distance algorithm, the second algorithm is a Jaccard distance algorithm; and when the first algorithm is the Jaccard distance algorithm, the second algorithm is the edit distance algorithm.

The third threshold and the fourth threshold may also be set based on the application scene, and there is no necessary to limit the size relationship between the third threshold and the fourth threshold, which will not be elaborated here.

Figure 5:
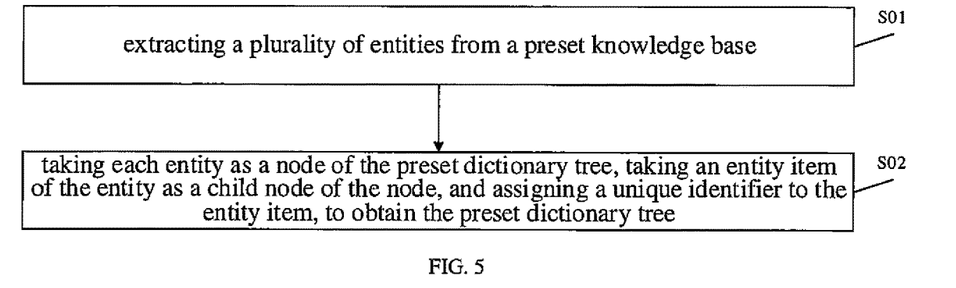
FIG. 5 is a flow chart illustrating a method for constructing a dictionary tree according to an embodiment of the present disclosure.

In combination with FIG. 5 that, before block S1, the method further includes a step of initializing, i.e., constructing the dictionary tree. In detail, constructing the dictionary tree includes the followings.

At block S01, a plurality of entities are extracted from a preset knowledge base.

At block S02, each entity is taken as a node of the preset dictionary tree, an entity item of the entity is taken as a child node of the node, and a unique identifier is assigned to the entity item, to obtain the preset dictionary tree.

In this embodiment, an improvement is made on the dictionary tree in the related art.

In detail, in the related art, when the dictionary tree is constructed, a plurality of entities are extracted from the knowledge base, and each entity is taken as the node of the preset dictionary tree (i.e., the dictionary tree model established in advance). However, in this embodiment, after the plurality of entities are extracted from the knowledge base and each entity is taken as the node of the preset dictionary tree, the entity item of each entity is inserted into the node of the entity as the child node of the node of the entity, and each entity item is assigned with a unique identifier.

One entity may correspond to a plurality of entity items, each entity item is taken as the child node of the entity, and the unique identifier is assigned to each entity item. For example, an entity A has 10 entity items, all the 10 entity items are inserted into the node of the entity A as 10 child nodes of the entity A.

In detail, the entity item may be, such as, an entry, an article, etc., which refers to narrative content of objects with different conceptual meanings. The entity items of the candidate entity may be all or a part of entity items corresponding to the candidate entity. The part of candidate entities and entity items may be selected based on different conditions. The specific selection way will not be limited in the present disclosure.

In detail, the term "knowledge base" refers to a data structure similar to a graph, which is composed of nodes and edges, such as a knowledge graph or other appropriate databases. In the knowledge base, each node represents an "entity" existing in the real world, each edge represents a "relationship" between entities. The knowledge base is an effective representation of relationships. In other words, the knowledge base links different kinds of information to form a relational network, to achieve an ability of analyzing problems from a 'relational" perspective.

With the embodiments of the present disclosure, the entity item of the entity is taken as the child node of the entity, which may distinguish different entity items and construct the dictionary tree flexibly and comprehensively, thereby implementing the error correction efficiently and precisely. And, by assigning the unique identifier to each entity item, a specific entity item may be located accurately based on the unique identifier, thereby implementing the error correction quickly.

At block S2, for each target candidate entity, a first probability that the target candidate entity is a legitimate entity is calculated.

The legitimate entity refers to an entity which is correctly represented.

At this block, the first probability represents a probability that the target candidate entity is the legitimate entity (a correct entity). In detail, the calculation is performed on each target candidate entity based on a language mode (e.g., the NGRAM language model), to obtain the first probability corresponding to the target candidate entity.

At block S3, each target candidate entity is evaluated, to obtain an evaluation result. One target candidate entity corresponds to one evaluation result.

An evaluating method in the related art may be employed to evaluate each target candidate entity. For example, an evaluation model in the related art may be employed for evaluating, or a calculation method may be employed for calculating, thereby implementing evaluating. A neural network model may be employed for evaluating.

Preferably, a LTR model is used to evaluate each target candidate entity.

The LTR (learning to rank) model refers to machine learning sorting. A basic principle of the LTR model is a linear model. And in embodiments of the present disclosure, the LTR model is constructed based on features such as the weight, grammar, morphology, dependency, term importance, and word embedding of the entity.

In detail, the LTR model evaluates a plurality of target candidate entities respectively. That is, the LTR model scores for each target candidate entity. In other words, when a certain target candidate entity is inputted to the LTR model, the LTR model may output a score corresponding to the target candidate entity.

In embodiments of the present disclosure, the evaluation result of the target candidate entity is obtained by combining the target candidate entity with the LTR model, thereby implementing to distinguish the evaluation results of respective target candidate entities in the plurality of target candidate entities. That is, difference between the target candidate entities may be obtained.

Figure 6:
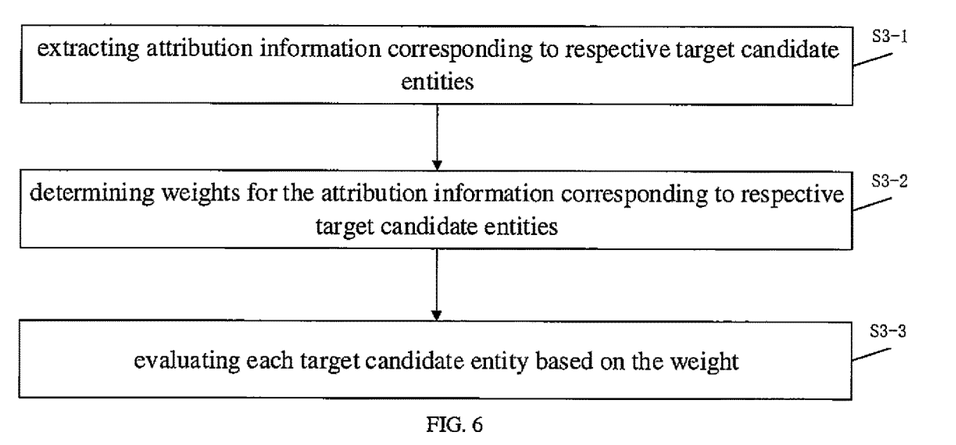
FIG. 6 is a flow chart illustrating an evaluating method according to an embodiment of the present disclosure.

In combination with FIG. 6, in some embodiments, block S3 may include the followings.

At block S3-1: attribution information corresponding to respective target candidate entities is extracted.

At the block, related knowledge information (i.e., attribution information) of different target candidate entities is not exactly the same. The related knowledge information (i.e., attribution information) of each target candidate entity is extracted.

At block S3-2, weights for the attribution information corresponding to respective target candidate entities are determined.

In embodiments of the present disclosure, there are a plurality of ways for determining the weight for the attribution information of each target candidate entity. For example, the weight may be determined for each target candidate entity based on a current application scene, or, the weight may be determined for each target candidate entity based on a method for marking the attribution information and the weight in the related art.

Preferably, the weight is determined for each target candidate entity based on a preset corresponding relationship between the attribution information and the weight.

In detail, weights for different attribution information may be determined in advance, that is, a priority weight may be set in advance based on a priority. The corresponding relationship between the weight and the attribution information may be established. For example, the corresponding relationship between the weight and the attribution information may be established through a mapping table. After the attribution information corresponding to a certain target candidate entity is extracted, the attribution information may be matched to the mapping table, to find the weight corresponding to the attribution information in the mapping table. That is, the action at block S3-2 is a step of "marking the weight", and procedures of marking the weights for the plurality of target candidate entities do not interfere with each other and may be performed in parallel.

The description will be made with reference to a detailed example. For example, after the user searches with a query request A and determines a plurality of target candidate entities based on the above method, when a target candidate entity B (such as «The Graver Robbers' Chronicles») is evaluated, attribution information (e.g., an actor, a category of the target candidate entity B, a type of a film, release time or the like) of the target candidate entity B may be obtained firstly and the weight is marked based on the attribution information. The marked result (including an intermediate result and a final result) may be displayed in form of chart.

At block S3-3, each target candidate entity is evaluated based on the weight.

Preferably, each target candidate entity is evaluated based on the LTR model.

With the technical solution for evaluating each target candidate entity according to embodiments of the present disclosure, the related knowledge information (i.e., attribute information) and various parameters of the target candidate entity are considered comprehensively, thereby implementing to output an evaluation result with high accuracy.

At block S4, a real intent entity corresponding to the query request is determined based on the first probability and the evaluation result.

The real intent entity refers to an entity that reflects the query request best. In other words, the real intent entity refers to an entity corresponding to a query result that best reflects an expectation of the user.

In embodiments of the present disclosure, since the obtained target candidate entity is comprehensive and precise, and the evaluation result of the obtained target candidate entity is accurate, the real intent entity with high accuracy may be obtained based on the first probability and the evaluation result of each target candidate entity, thereby improving an efficiency and an accuracy of error correction.

Figure 7:
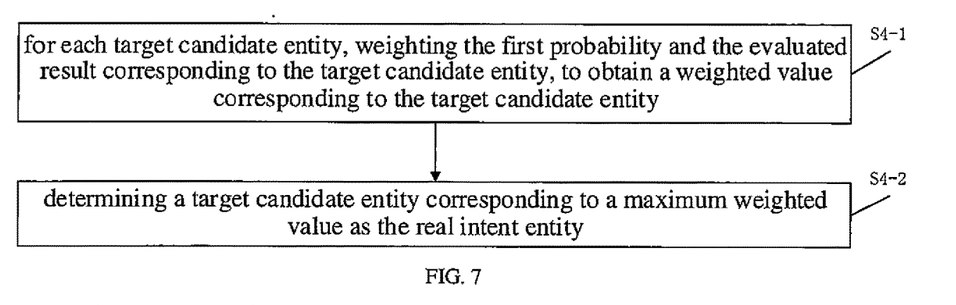
FIG. 7 is a flow chart illustrating a method for determining a real intent entity according to an embodiment of the present disclosure.

In combination with FIG. 7, in some embodiments, block S4 includes the followings.

At block S4-1, for each target candidate entity, the first probability and the evaluation result corresponding to the target candidate entity are weighted, to obtain a weighted value corresponding to the target candidate entity.

At block S4-2, a target candidate entity corresponding to a maximum weighted value is determined as the real intent entity.

In detail, the plurality of weighted values may be sorted in an ascending or descending order, the maximum weighted value is selected from the plurality of weighted values, and the target candidate entity corresponding to the maximum weighted value may be determined as the real intent entity.

With embodiments of the present disclosure, the target candidate entity corresponding to the maximum weighted value is selected and the target candidate entity is determined as an entity actually expected by the user, such that the real query intent of the user may be determined precisely, thereby improving the query experience of the user.

According to another aspect of embodiments of the present disclosure, embodiments of the present disclosure further provide an error correction apparatus.

Figure 8:
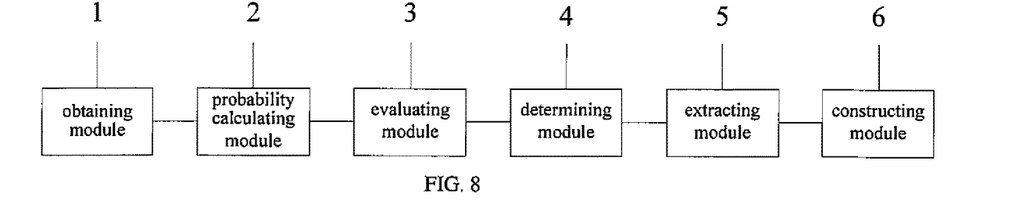
FIG. 8 is a block diagram illustrating an error correction apparatus according to an embodiment of the present disclosure.

FIG. 8 is a block diagram illustrating an error correction apparatus according to an embodiment of the present disclosure.

As illustrated in FIG. 8, the error correction apparatus includes: an obtaining module 1, a probability calculating module 2, an evaluating module 3 and a determining module 4. The obtaining module 1 is configured to determine a plurality of target candidate entities from a preset dictionary tree based on a query request. The probability calculating module 2 is configured to, for each target candidate entity, calculate a first probability that the target candidate entity is a legitimate entity. The evaluating module 3 is configured to evaluate each target candidate entity to obtain an evaluation result, one target candidate entity corresponding to one evaluation result. The determining module 4 is configured to determine a real intent entity corresponding to the query request based on the first probability and the evaluation result.

In some embodiments, the probability calculating module 2 is further configured to calculate a second probability that the query request is inputted correctly; and the obtaining module 1 is configured to determine the plurality of target candidate entities from the preset dictionary tree based on the query request in response to that the second probability is smaller than a first threshold.

In some embodiments, the obtaining module 1 is configured to: perform a calculation on a character string in the query request and the preset dictionary tree, to obtain a plurality of original candidate entities; and select the plurality of target candidate entities corresponding to the query request from the plurality of original candidate entities based on a second threshold.

In some embodiments, the obtaining module 1 is configured to: calculate a first distance between each original candidate entity and the query request; compare each first distance with the second threshold; and determine the original candidate entity corresponding to the first distance smaller than or equal to the second threshold as the target candidate entity.

In some embodiments, when the second threshold includes a third threshold and the fourth threshold, the obtaining module is configured to: calculate a second distance between each original candidate entity and the query request based on a first algorithm; compare each second distance with the third threshold; extract a first candidate entity corresponding to the second distance smaller than or equal to the third threshold from the plurality of original candidate entities; calculate a third distance between each first candidate entity and the query request based on a second algorithm; and take the first candidate entity corresponding to the third distance smaller than or equal to the fourth threshold as the target candidate entity.

In some embodiments, when the first algorithm is an edit distance algorithm, the second algorithm is a Jaccard distance algorithm; and when the first algorithm is the Jaccard distance algorithm, the second algorithm is the edit distance algorithm.

In some embodiments, the evaluating module 3 is configured to: extract attribution information corresponding to respective target candidate entities; determine weights for the attribution information corresponding to respective target candidate entities; and evaluate each target candidate entity based on the weight.

In some embodiments, the determining module 4 is configured to: for each target candidate entity, weight the first probability and the evaluation result corresponding to the target candidate entity, to obtain a weighted value corresponding to the target candidate entity; and determine a target candidate entity corresponding to a maximum weighted value as the real intent entity.

In combination with FIG. 8, in some embodiments, the apparatus further includes: an extracting module 5 and a constructing module 6. The extracting module 5 is configured to extract a plurality of entities from a preset knowledge base. The constructing module 6 is configured to take each entity as a node of the preset dictionary tree, to take an entity item of the entity as a child node of the node, and to assign a unique identifier to the entity item, to obtain the preset dictionary tree.

Figure 9:
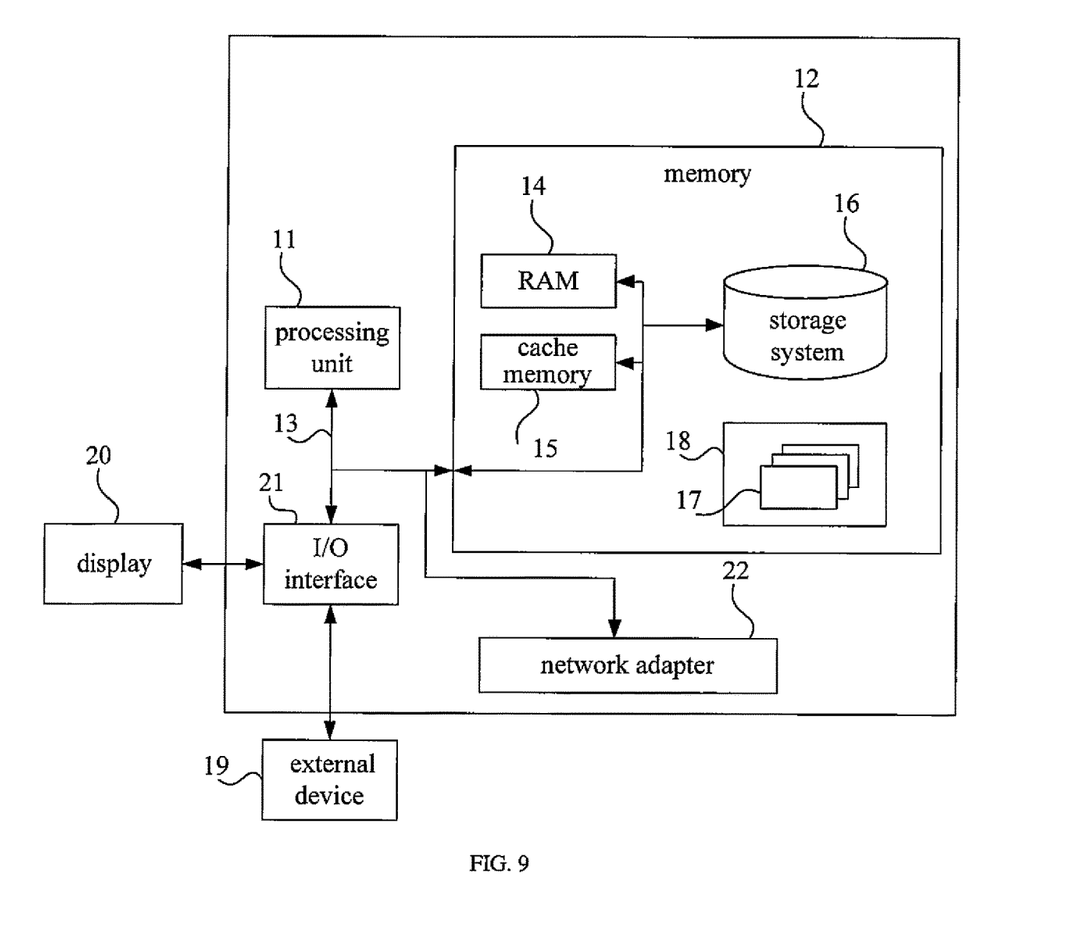
FIG. 9 is a block diagram illustrating an error correction apparatus according to an embodiment of the present disclosure.

FIG. 9 is a block diagram illustrating an error correction apparatus according to an embodiment of the present disclosure.

The error correction apparatus illustrated in FIG. 9 is merely an example, which may not bring any limitation to functions and the scope of embodiments of the present disclosure.

As illustrated in FIG. 9, the error correction apparatus is embodied in the form of a general-purpose computer device. Components of the error correction apparatus may include but be not limited to: one or more processors or processing units 11, a memory 12, and a bus 13 connecting different system components (including the memory 12 and the processing unit 11).

The bus 13 represents one or more of several bus structures, including a storage bus or a storage controller, a peripheral bus, an accelerated graphics port and a processor or a local bus with any bus structure in the plurality of bus structures. For example, these architectures include but are not limited to an industry standard architecture (ISA) bus, a micro channel architecture (MAC) bus, an enhanced ISA bus, a video electronics standards association (VESA) local bus and a peripheral component interconnection (PCI) bus.

The error correction apparatus typically includes various computer system readable mediums. These mediums may be any usable medium that may be accessed by the error correction apparatus, including volatile and non-volatile mediums, removable and non-removable mediums.

The memory 12 may include computer system readable mediums in the form of volatile medium, such as a random access memory (RAM) 14 and/or a cache memory 15. The error correction apparatus may further include other removable/non-removable, volatile/non-volatile computer system storage mediums. Only as an example, the storage system 16 may be configured to read from and write to non-removable, non-volatile magnetic mediums (not illustrated in FIG. 9, which is usually called "a hard disk driver"). Although not illustrated in FIG. 9, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 13 by one or more data medium interfaces. The memory 12 may include at least one program product. The program product has a set of program modules (such as, at least one program module), and these program modules are configured to execute functions of respective embodiments of the present disclosure.

A program/utility tool 18, having a set (at least one) of program modules 17, may be stored in the memory 12. Such program modules 17 include but not limited to an operating system, one or more application programs, other program modules, and program data. Each or any combination of these examples may include an implementation of a networking environment. The program module 17 usually executes functions and/or methods described in embodiments of the present disclosure.

The error correction apparatus may communicate with one or more external devices 19 (such as a keyboard, a pointing device, and a display 20), may further communicate with one or more devices enabling a user to interact with the error correction apparatus, and/or may communicate with any device (such as a network card, and a modem) enabling the error correction apparatus to communicate with one or more other computing devices. Such communication may occur via an Input/Output (I/O) interface 21. Moreover, the error correction apparatus may further communicate with one or more networks (such as local area network (LAN), wide area network (WAN) and/or public network, such as Internet) via a network adapter 22. As illustrated in FIG. 9, the network adapter 22 communicates with other modules of the error correction apparatus via the bus 13. It should be understood that, although not illustrated in FIG. 9, other hardware and/or software modules may be used in combination with the error correction apparatus, including but not limited to: microcode, device drivers, redundant processing units, external disk drive arrays, RAID (redundant array of independent disks) systems, tape drives, and data backup storage systems, etc.

The processing unit 11, by operating programs stored in the memory 12, executes various function applications and data processing, for example implements the error correction method provided in embodiments of the present disclosure.

According to another aspect of embodiments of the present disclosure, embodiments of the present disclosure further provide a computer readable storage medium having a computer program stored thereon. When the computer program is executed by a processor, the above method may be implemented.

It should be understood by the skilled in the art that, all or parts of the steps, the system, and functional modules/units in the apparatus in the above method may be implemented as software, firmware, hardware, and appropriate combinations thereof. In a hardware implementation, the division between functional modules/units mentioned in the above description does not necessarily correspond to the division of physical components. For example, one physical component may have multiple functions, or one function or step may be performed in cooperation of several physical components. Some or all physical components may be implemented as software executed by a processor such as a central processing unit, a digital signal processor, or a microprocessor, implemented as hardware, or implemented as an integrated circuit such as an application specific integrated circuit. Such software may be distributed on a computer-readable medium, which may include a computer storage medium (or a non-transitory medium) and a communication medium (or a transitory medium). As is well known to the skilled in the art, the term "computer storage medium" includes a volatile and non-volatile, removable and non-removable medium implemented in any method or technology used to store information (such as computer-readable instructions, data structures, program modules or other data). The computer storage medium includes, but is not limited to, a random access memory (RAM), a read-only memory (ROM), an electrically erasable programmable read-only memory (EEPROM), flash memory or other memory technologies, a compact disk read-only memory (CDROM), a digital versatile disk (DVD) or other optical disk storage, magnetic cartridges, magnetic tape, disk storage or other magnetic storage devices, or may any other medium used to store desired information and accessed by a computer. In addition, it is well known to the skilled in the art that a communication medium typically may include the computer-readable instructions, the data structures, the program modules or other data in a modulated data signal such as a carrier wave or other transmission mechanism, and include any information delivery medium.

The application discloses exemplary embodiments. Although specific terms are employed, they should only be interpreted as a general illustrative meaning, and not for limiting purposes. In some embodiments, it will be apparent to the skilled in the art that, unless explicitly stated otherwise, features, characteristics and/or elements described in combination with a particular embodiment may be used alone, or features, characteristics and/or components described in combination with other embodiments are used in combination. Therefore, the skilled in the art should understand that, various changes in form and details may be made without departing from the scope of the present disclosure as set forth in the appended claims.

What is claimed is:

1. An error correction method, implemented by a computer, comprising:
   determining a plurality of target candidate entities from a preset dictionary tree based on a query request;
   for each target candidate entity, obtaining a first probability that the target candidate entity is a legitimate entity by calculating the target candidate entity based on a language model;

evaluating, based on an evaluation model, each target candidate entity to obtain an evaluation result, a target candidate entity corresponding to an evaluation result; and determining a real intent entity corresponding to the query request based on the first probability and the evaluation result;

wherein evaluating each target candidate entity comprises:

extracting attribution information corresponding to respective target candidate entities;

determining weights for the attribution information corresponding to respective target candidate entities; and evaluating each target candidate entity based on the weight;

wherein determining the real intent entity corresponding to the query request based on the first probability and the evaluation result comprises:

for each target candidate entity, weighting the first probability and the evaluation result corresponding to the target candidate entity, to obtain a weighted value corresponding to the target candidate entity; and determining a target candidate entity corresponding to a maximum weighted value as the real intent entity.

2. The error correction method of claim 1, further comprising:

calculating a second probability that the query request is inputted correctly;

wherein determining the plurality of target candidate entities from the preset dictionary tree based on the query request comprises:

determining the plurality of target candidate entities from the preset dictionary tree based on the query request in response to that the second probability is smaller than a first threshold.

3. The error correction method of claim 1, further comprising:

extracting a plurality of entities from a preset knowledge base; and taking each entity as a node of the preset dictionary tree, taking an entity item of the entity as a child node of the node, and assigning a unique identifier to the entity item, to obtain the preset dictionary tree.

4. An error correction apparatus, comprising:

a processor;

a memory, having computer programs executable by the processor;

wherein when the computer programs are executed by the processor, the processor is caused to perform followings:

determining a plurality of target candidate entities from a preset dictionary tree based on a query request;

for each target candidate entity, obtaining a first probability that the target candidate entity is a legitimate entity by calculating the target candidate entity based on a language model;

evaluating, based on an evaluation model, each target candidate entity to obtain an evaluation result, a target candidate entity corresponding to an evaluation result; and determining a real intent entity corresponding to the query request based on the first probability and the evaluation result;

wherein evaluating each target candidate entity comprises:

extracting attribution information corresponding to respective target candidate entities;

determining weights for the attribution information corresponding to respective target candidate entities; and evaluating each target candidate entity based on the weight;

wherein determining the real intent entity corresponding to the query request based on the first probability and the evaluation result comprises:

for each target candidate entity, weighting the first probability and the evaluation result corresponding to the target candidate entity, to obtain a weighted value corresponding to the target candidate entity; and determining a target candidate entity corresponding to a maximum weighted value as the real intent entity.

5. The error correction apparatus of claim 4, wherein the processor is caused to further perform calculating a second probability that the query request is inputted correctly;

wherein determining the plurality of target candidate entities from the preset dictionary tree based on the query request comprises: determining the plurality of target candidate entities from the preset dictionary tree based on the query request in response to that the second probability is smaller than a first threshold.

6. The error correction apparatus of claim 4, wherein the processor is caused to further perform:

extracting a plurality of entities from a preset knowledge base; and taking each entity as a node of the preset dictionary tree, to take an entity item of the entity as a child node of the node, and to assign a unique identifier to the entity item, to obtain the preset dictionary tree.

7. A non-transitory computer readable storage medium having computer programs stored thereon, wherein when the computer programs are executed by a processor, the processor is caused to perform:

determining a plurality of target candidate entities from a preset dictionary tree based on a query request;

for each target candidate entity, obtaining a first probability that the target candidate entity is a legitimate entity by calculating the target candidate entity based on a language model;

evaluating, based on an evaluation model, each target candidate entity to obtain an evaluation result, a target candidate entity corresponding to an evaluation result; and determining a real intent entity corresponding to the query request based on the first probability and the evaluation result;

wherein evaluating each target candidate entity comprises:

extracting attribution information corresponding to respective target candidate entities;

determining weights for the attribution information corresponding to respective target candidate entities; and evaluating each target candidate entity based on the weight;

wherein determining the real intent entity corresponding to the query request based on the first probability and the evaluation result comprises:

for each target candidate entity, weighting the first probability and the evaluation result corresponding to the target candidate entity, to obtain a weighted value corresponding to the target candidate entity; and determining a target candidate entity corresponding to a maximum weighted value as the real intent entity.

8. The error correction method of claim 1, wherein, determining the plurality of target candidate entities from the preset dictionary tree based on the query request comprises:
performing a calculation on a character string in the query request and the preset dictionary tree, to obtain a plurality of original candidate entities; and
selecting the plurality of target candidate entities corresponding to the query request from the plurality of original candidate entities based on a second threshold.

9. The error correction apparatus of claim 4, wherein determining the plurality of target candidate entities from the preset dictionary tree based on the query request comprises:
performing a calculation on a character string in the query request and the preset dictionary tree, to obtain a plurality of original candidate entities; and
selecting the plurality of target candidate entities corresponding to the query request from the plurality of original candidate entities based on a second threshold.

10. The error correction method of claim 1, wherein the language model comprises a NGRAM language model.

11. The error correction method of claim 1, wherein evaluating each target candidate entity employs a neural network model.

12. The error correction method of claim 1, wherein a learning to rank model is utilized in the evaluating each target candidate entity.

13. The error correction method of claim 8, wherein selecting the plurality of target candidate entities corresponding to the query request from the plurality of original candidate entities based on the second threshold comprises:
calculating a first distance between each original candidate entity and the query request;
comparing each first distance with the second threshold; and
determining the original candidate entity corresponding to the first distance smaller than or equal to the second threshold as the target candidate entity.

14. The error correction method of claim 8, wherein when the second threshold comprises a third threshold and the fourth threshold, selecting the plurality of target candidate entities corresponding to the query request from the plurality of original candidate entities based on the second threshold comprises:
calculating a second distance between each original candidate entity and the query request based on a first algorithm;
comparing each second distance with the third threshold;
extracting a first candidate entity corresponding to the second distance smaller than or equal to the third threshold from the plurality of original candidate entities;
calculating a third distance between each first candidate entity and the query request based on a second algorithm; and
taking the first candidate entity corresponding to the third distance smaller than or equal to the fourth threshold as the target candidate entity.

15. The error correction method of claim 14, wherein when the first algorithm is an edit distance algorithm, the second algorithm is a Jaccard distance algorithm; and when the first algorithm is the Jaccard distance algorithm, the second algorithm is the edit distance algorithm.

16. The error correction apparatus of claim 9, wherein selecting the plurality of target candidate entities corresponding to the query request from the plurality of original candidate entities based on the second threshold comprises:
calculating a first distance between each original candidate entity and the query request;
comparing each first distance with the second threshold; and
determining the original candidate entity corresponding to the first distance smaller than or equal to the second threshold as the target candidate entity.

17. The error correction apparatus of claim 9, wherein when the second threshold comprises a third threshold and the fourth threshold, selecting the plurality of target candidate entities corresponding to the query request from the plurality of original candidate entities based on the second threshold comprises:
calculating a second distance between each original candidate entity and the query request based on a first algorithm;
comparing each second distance with the third threshold;
extracting a first candidate entity corresponding to the second distance smaller than or equal to the third threshold from the plurality of original candidate entities;
calculating a third distance between each first candidate entity and the query request based on a second algorithm; and
taking the first candidate entity corresponding to the third distance smaller than or equal to the fourth threshold as the target candidate entity.

18. The error correction apparatus of claim 17, wherein when the first algorithm is an edit distance algorithm, the second algorithm is a Jaccard distance algorithm; and when the first algorithm is the Jaccard distance algorithm, the second algorithm is the edit distance algorithm.

* * * * *